M. ARNDT.
DEVICE FOR INDICATING THE USEFUL PRESSURE IN ENGINES.
APPLICATION FILED MAR. 3, 1909.

981,152.

Patented Jan. 10, 1911.

Witnesses
Jesse N. Sutton
R. Kommers

Inventor
Max Arndt
by
Henry Orth Jr.
Atty

UNITED STATES PATENT OFFICE.

MAX ARNDT, OF AIX-LA-CHAPELLE, GERMANY.

DEVICE FOR INDICATING THE USEFUL PRESSURE IN ENGINES.

981,152.  Specification of Letters Patent.  Patented Jan. 10, 1911.

Application filed March 3, 1909. Serial No. 481,059.

*To all whom it may concern:*

Be it known that I, MAX ARNDT, a subject of the German Emperor, and residing at Aix-la-Chapelle, Germany, have invented certain new and useful Improvements in Devices for Indicating the Useful Pressure in Engines, of which the following is a specification.

My invention relates to devices for recording the useful pressure of an engine, which is to be indicated, in such manner that the compression pressure is not measured and consequently only the effective useful pressure of the engine is recorded.

In the new device an electric current which depends on the movements of the indicator-piston passes through a measuring apparatus, so that the recorded current corresponds to the movements of the indicator. The movement of the indicator-piston which corresponds to the pressure in the engine during the compression, however, is not measured.

My invention substantially consists in providing a controlling device, connected with the indicator, for closing and opening the circuit of the electric current which is to be measured, the arrangement being such that the controlling device does not work during the compression pressure, whereas during the admission pressure the indicator-piston reciprocates a contact on a number of contacts connected with resistances in the circuit.

Figure 1:
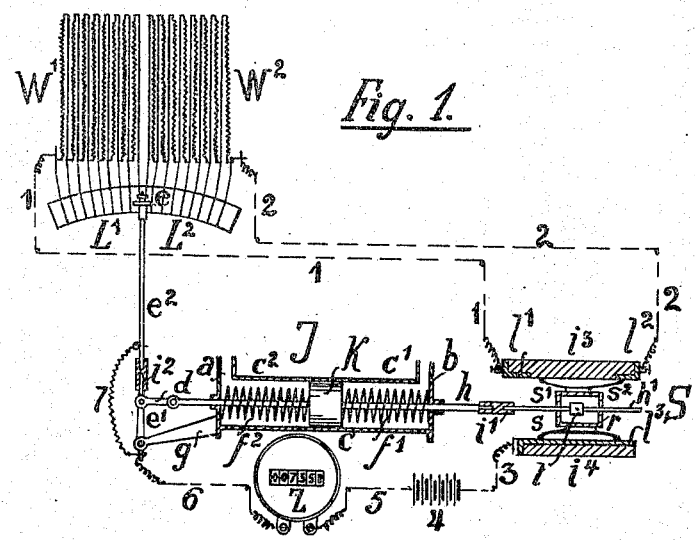
Figure 2:
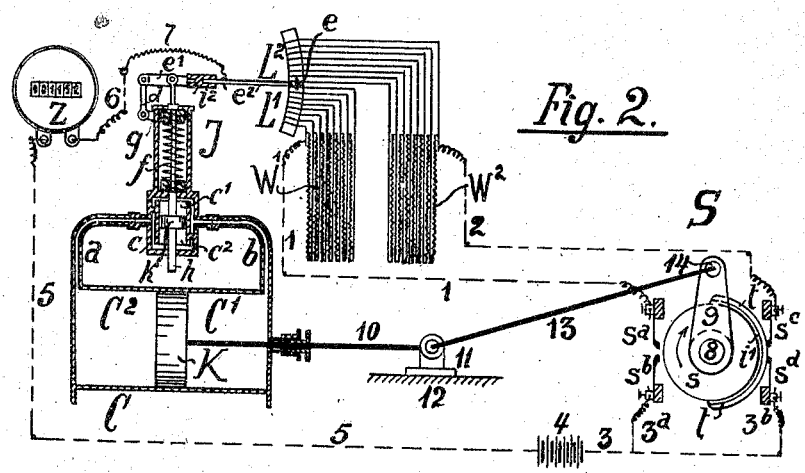

In the accompanying drawing the device is represented diagrammatically by way of example, Figure 1 showing one constructional form, whereas Fig. 2 shows a modified form.

Referring to the drawing, S indicates the reversing device, J the indicator; $c$ denotes the cylinder of the differential indicator which is connected by the pipes $a$, $b$ with the two sides of the cylinder of the engine which is to be indicated. In front of and behind the piston $k$ are arranged springs $f^1$, $f^2$, the former in the chamber $c^1$ and the latter in the chamber $c^2$ of the indicator cylinder. The indicator piston-rod $h$ is connected by means of a link $d$ with a contact lever $e^1$, $e^2$ which is mounted in a bracket $g$ and carries at its free end a roller $e$. The two parts $e^1$ and $e^2$ of the contact lever are mechanically connected with one another in an insulating sleeve $i^2$. When the engine is being indicated the contact roller $e$ rolls over two groups of electric contacts $L^1$, $L^2$ which are insulated from one another. The contacts $L^1$ are connected with a group of resistances $W^1$ and the contacts $L^2$ with the group of resistances $W^2$. The indicator piston-rod $h$ has attached to it by means of an insulating member or sleeve $i^1$ a tail rod $h^1$, on which is attached a boss $t$ which, when the engine is being indicated, pushes a frame $r$ alternately toward the one or the other side and thereby operates the two-way or reversing switch S. The controlling member $t$ has so much play in the frame $r$ that it only hits the latter and moves it to one side when the compression pressure is ended and the admission pressure begins on the opposite side of the indicator-piston $k$, and accordingly the frame $r$ is only switched over after one of the springs $f^1$ or $f^2$ has taken up the compression pressure. With the electrically conducting frame $r$ there are connected contact springs $s^1$, $s^2$ and $s^3$ which are displaceable between two insulating bars $i^3$ and $i^4$; the former of these bars carries two contacts $l^1$, $l^2$ and the latter a conductor $l^3$. The contact $l^1$ is connected by a conductor 1 with the group of resistances $W^1$. The contact $l^2$ is connected through the conductor 2 with the group of resistances $W^2$. The conductor $l^3$ is connected by way of a conductor 3, source of current 4 and a conductor 5 with an electrical measuring instrument $z$, the latter being connected by conductors 6 and 7 with the contact lever $e^2$. The flexible conductor 7 can move freely with the rocking lever $e^2$.

The device operates as follows: If pressure above atmospheric exists in the cylinder chamber $c^1$, the piston-rod $h$ moves to the left and drives the roller $e$ over a part of the resistance contacts $L^1$ and simultaneously the boss $t$ drives the frame $r$ to the left, whereby the contact $s^1$, $l^1$ is made and consequently the following circuit is closed:—battery 4, lead 3, contact $s^3$, contact $s^1$, contact $l^1$, lead 1 roller $e$, lever $e^2$, leads 7 and 6, measuring instrument $z$ and lead 5. The current, which has to pass through a definite number of sections of the resistance $W^1$ corresponding to the position of the roller $e$, is measured in the instrument $z$. The further the roller $e$ is deflected to the left, the fewer resistances are in the circuit. The conductor 2 is without current during this movement of the piston-rod $h$ to the left. If the chamber $c^2$ of the indicator cylinder has a pressure above atmospheric, the piston-rod $h$ moves to the right, closes the contact $s^2$, $l^2$ and closes the following circuit:—source of current 4, lead 3, contact $s^3$, contact $s^2$, contact $l^2$, lead 2, roller $e$, lever $e^2$, leads 7 and 6, instrument $z$, and lead 5. When the piston-rod $h$ is moved, the roller $e$ is simultaneously moved over the contacts $L^2$ and a number of sections of the resistance $W^2$ is cut out. When the reversal of stroke of the engine occurs the electric circuit is alternately interrupted in the one group of contacts $L^1$, but is closed in the other group of contacts $L^2$ on the contrary, and reversely, and as each reversal of stroke of the engine coincides with the end of a compression pressure and with the commencement of an admission pressure, only that group of contacts receives current on which the contact roller $e$ is placed by the useful pressure, whereas the compression pressure moves the contact roller $e$ always onto a contact $L^1$ or $L^2$ without current.

In the modified form of the device represented in Fig. 2 the reversing switch S is operated by a member $s$ moved by the engine which is to be indicated; the engine is represented diagrammatically by cylinder C, piston K, piston-rod 10, crosshead 11, crosshead guide 12, connecting-rod 13, crankpin 14, crank 9 and crank-shaft 8. Both sides $C^2$ and $C^1$ of the steam-engine cylinder C are connected by pipes $a$ and $b$ with the differential indicator J, the pipe $b$ leading to the chamber $c^1$ and the pipe $a$ to the chamber $c^2$. The indicator piston $k$ and its piston-rod $h$ are connected with a contact roller $e$ in like manner as in the form shown in Fig. 1, said roller being moved on the groups of contacts $L^1$ and $L^2$ when the engine is being indicated.

The reversing switch S consists of a semicircular conductor $t$ provided with insulation $i^1$ and connected by means of the disk $s$ fixed on the crank-shaft 8 with the engine which is to be indicated in such manner that during the compression periods the contacts $s^a$, $s^b$ and $s^c$, $s^d$ are not closed. The contact $s^a$ is connected by a conductor 1 with the group of resistances $W^1$ and the contact $s^c$ by the conductor 2 with the group of resistances $W^2$. The contacts $s^b$ and $s^d$, on the contrary, are connected by conductors $3^a$, $3^b$ and 3, source of current 4 and conductor 5 with the counter or measuring instrument $z$, and the latter is connected by conductors 6 and 7 with the contact lever $e^2$ of the indicator J.

I claim:

1. In means for continuously measuring the useful pressure in an engine cylinder, the combination, with an engine indicator having a piston, of a source of current, a measuring instrument connected with one pole of the latter, two groups of resistances each provided with a series of contacts, means electrically connected with said instrument and mechanically connected with the piston of the indicator movable on said contacts, and switching means electrically connected with said resistances and with the other pole of the source of current, and operated in dependence on the useful pressure at the two sides of the piston of the engine which is being indicated, for closing the circuits of said resistances.

2. In means for continuously measuring the useful pressure in an engine cylinder, the combination, with an engine indicator having a piston, of a source of current, a measuring instrument connected with one pole of the latter, two groups of resistances each provided with a series of contacts, a lever electrically connected with said instrument and mechanically connected with the piston of the indicator movable on said contacts, and a two-way switch connected electrically with said groups of resistances and with the other pole of the source of current and connected mechanically with play with the piston of the indicator, as set forth.

3. In means for continuously measuring the useful pressure in an engine cylinder, the combination, with an engine indicator having a piston, of a source of current, a measuring instrument connected with one pole of the latter, two groups of resistances each provided with a series of contacts, a contact lever electrically connected with said instrument and mechanically connected with the piston of the indicator movable on said contacts, and a reversing switch comprising two switch-contacts each connected with one of said groups of resistances, a switch-contact connected with the other pole of the source of current, a tail rod having a boss driven by the indicator piston, an electrically conducting frame inclosing said boss and movable freely on said tail rod, a spring on said frame continually contacting the latter switch-contact, and another spring on said frame adapted to always contact one or the other of the former switch-contacts.

4. In a device of the class described, the combination with an engine indicator cylinder and piston; of a source of current, an electrical measuring instrument connected with one pole of the latter, two groups of resistances, each group of which is provided with contacts, means electrically connected with said instrument and mechanically connected with said piston and movable over said contacts, an electrical switch to send current alternately through said groups of resistances, and means to automatically actuate the switch.

5. In a device of the class described, the combination in an electrical circuit having therein a source of current, an electrical measuring instrument and two groups of resistances and their contacts; of steam actuated means included in said circuit to operate in connection with said contacts and resistances, and steam actuated means to alternately send current to the groups of resistances after the compression in the engine to be indicated has ceased.

In testimony whereof, I affix my signature in the presence of two witnesses.

MAX ARNDT.

Witnesses:
HENRY QUADFLIEG,
ELISE KOELBUSCH.